United States Patent [19] [11] 4,273,253
Tanaka et al. [45] Jun. 16, 1981

[54] AUTOMATIC VENDING MACHINE

[75] Inventors: Nobuyasu Tanaka; Kazuhira Nakajima; Kaoru Yamaguchi; Shinji Hara; Morihiro Murata; Tetuyosi Nakazima; Hirosi Matuo; Akura Onishi; Kazuo Hirano, all of Kawasaki, Japan

[73] Assignee: Fuji Electric Co., Ltd., Kawasaki, Japan

[21] Appl. No.: 87,180

[22] Filed: Oct. 22, 1979

[30] Foreign Application Priority Data

Oct. 26, 1978 [JP] Japan .................. 53-131995

[51] Int. Cl.³ ............................................ B65H 29/34
[52] U.S. Cl. ........................................ 221/75; 221/89
[58] Field of Search ............ 221/289, 299, 300, 124, 221/125, 75, 67, 89, 292, 293, 297, 204; 193/32; 312/45, 72

[56] References Cited

U.S. PATENT DOCUMENTS 1,649,365  11/1927  Poling et al. .................. 221/89 X Primary Examiner—Stanley H. Tollberg
Attorney, Agent, or Firm—Sughrue, Rothwell, Mion, Zinn and Macpeak

[57] ABSTRACT

A product rack structure for an automatic vending machine for cylindrically-shaped product items including a movable rack board disposed opposite one sidewall of the rack housing. Product supporting members are provided opposite one another on the rack board and sidewall. To vend a product item, the rack board is reciprocated once up and down. The vertical pitch of the supporting members, the horizontal spacing between supporting members and the stroke length of the rack board are determined such that each product item drops by one space for each reciprocation of the rack board.

9 Claims, 14 Drawing Figures

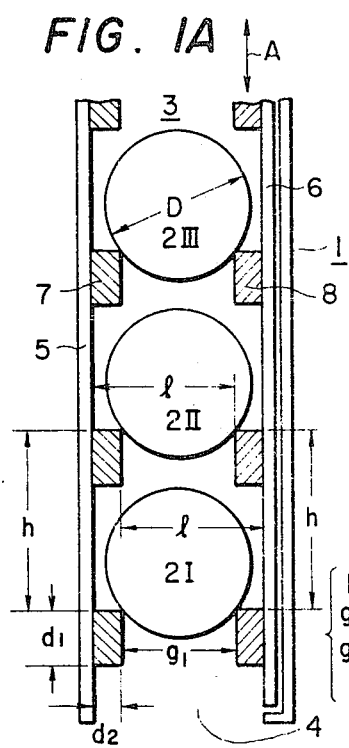
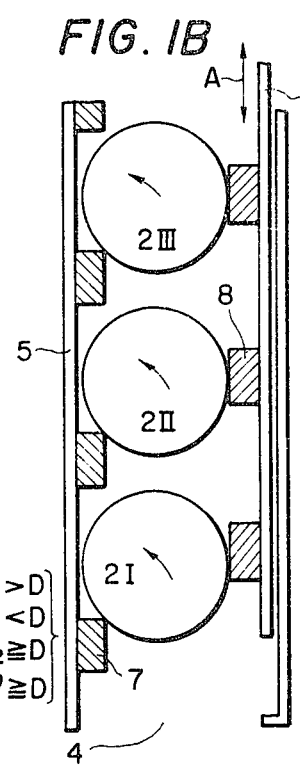
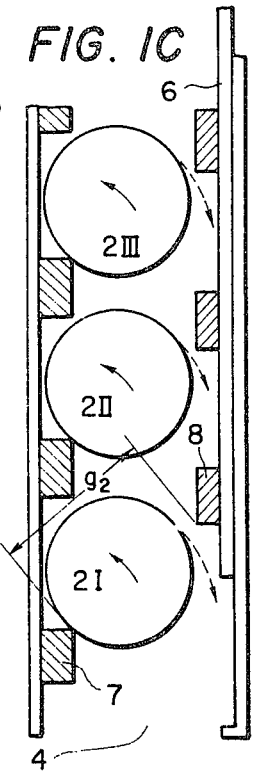
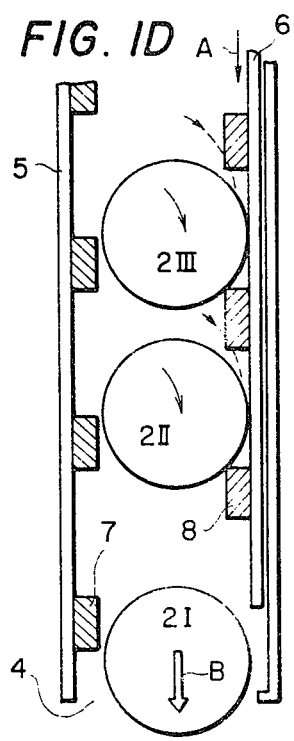
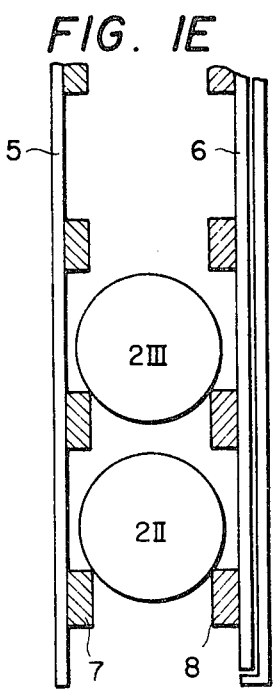

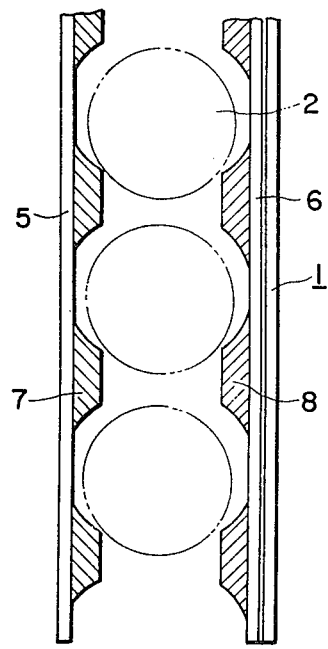
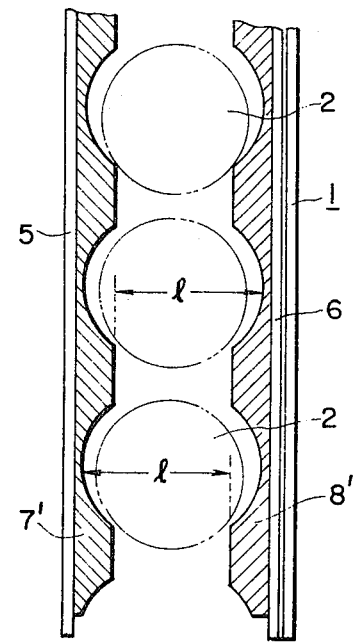
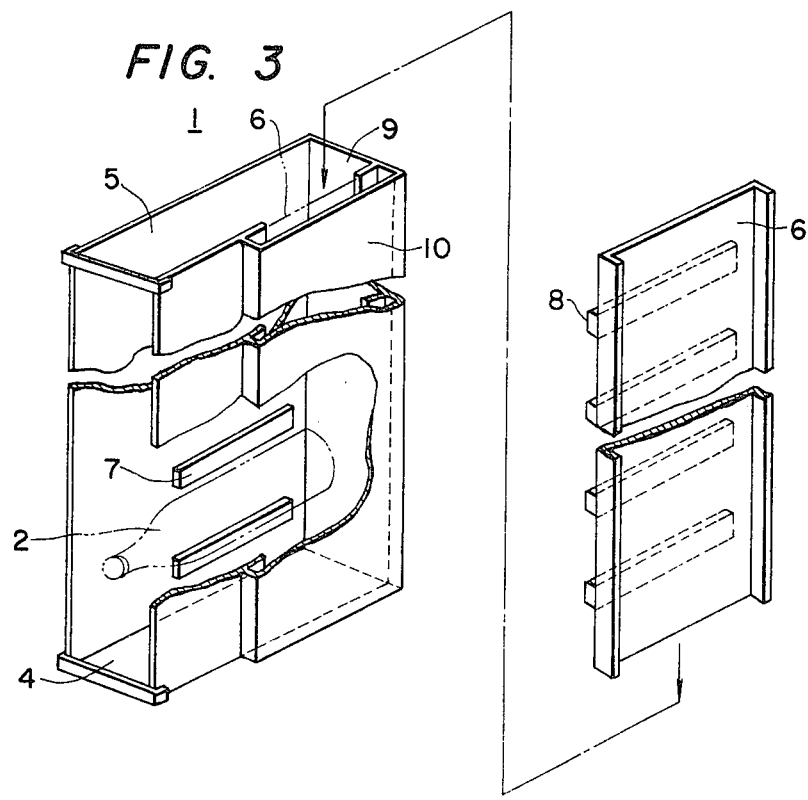

AUTOMATIC VENDING MACHINE

BACKGROUND OF THE INVENTION

The invention relates to a vending product vertical stacking rack for an automatic vending machine which is suitable for handling items such as large and heavy bottles or cans which are cylindrical and identical in shape.

A so-called "product vertical stacking rack" is well known as a commodity rack for handling such commodity items as described above which are cylindrical and identical in configuration. Such a conventional commodity rack includes a rack housing in which the commodities are stacked in a straight line one on top of another or in a staggered arrangement and a flipper or a flipper-type product delivering mechanism is provided at the product delivering outlet in the lower portion of the rack housing so as to control the delivery of the products.

The above-described product vertical stacking rack is advantageous in that it is simple in construction and accordingly low in manufacturing cost. However, it is disadvantageous in the following respects. First, a heavy weight is exerted on the lowermost item. That is, the sum of the weights of the remaining items above the lowermost item is exerted on the lowermost item. Accordingly, when the lowermost item is discharged from the rack housing, it strikes against the product delivering mechanism and the various items may strike against one another. If the products are heavy bottles they may be damaged or broken by the ensuing impact when the lowermost bottle is discharged.

Furthermore, a product vertical stacking rack in which products are stacked vertically along two straight lines or in a staggered arrangement and right and left locking members of the product delivering mechanism are alternately moved up and down is known in the art as one example of the product vertical stacking rack described above. This conventional product rack is advantageous in that delivery control can be more readily provided than in the above-described product rack in which the product items are stacked vertically on top of one another. However, that product rack is still disadvantageous in that since the products are stacked vertically along two straight lines or in a staggered arrangement, the width of the rack housing is necessarily large. Furthermore, as the product items are stacked one on another in the rack housing, when the lowermost item is discharged from the rack housing, the remaining items fall successively by their own weight. Therefore, after a person pulls out one item, he can often pull out the remaining items dishonestly. Thus, the reliability of this arrangement in terms of theft prevention is low.

The above-described damage or breakage of products can be prevented by providing a separate holder for each item in the rack. A product rack in which product items are separately held, termed "an elevator mechanism-type product rack" is known in the art. In this conventional product rack, the items will not strike against one another and accordingly are not broken during delivery. However, the drive control for the elevator mechanism is quite intricate and expensive. Furthermore, it is necessary to provide a special lock mechanism for the drive motor of the elevator mechanism which is moved downwardly by one step for every product delivery operation with the elevator mechanism maintained at the stop position between delivery operations. If the lock mechanism becomes inoperable, the elevator mechanism will move downwardly by weight of the products as a result of which all of the product items are discharged. Accordingly, such a product rack which when it fails tends to discharge all of the products is not suitable for an automatic vending machine. In addition, in the case of a multi-section-type automatic vending machine, it is necessary to provide a special drive motor for each of the columns thereof as it is necessary to stop and lock the drive motor separately for each product selection.

Accordingly, an object of this invention is to eliminate all of the above-described difficulties accompanying a conventional product rack. More specifically, an object of the invention is to provide a novel vertical stacking-type product rack in which the product items are not damaged or broken during the delivery operation, it is impossible to pull the items downwardly when the product rack is in its standby state so that theft can be positively prevented, the construction and drive operation are simple so that the reliability of the machine is high, and the width of the rack is small.

SUMMARY OF THE INVENTION

The foregoing objects and other objects of the invention may be achieved by the provision of a product rack which according to the invention, includes a rack housing which contains products arranged along a single vertical line with a product delivery outlet at the bottom thereof, a movable rack board provided opposite one side wall of the rack housing and which is movable vertically, first and second groups of product supporting members provided respectively on the side wall and the movable rack board in such a manner that the product supporting members are arranged vertically at equal intervals protruding inwardly, and a drive mechanism for carrying out in response to a product selling instruction a lifting operation in which the movable rack board is moved upwardly from its lower standby position and is then moved downwardly to return it to the lower standby position. The dimensions of the relevant components and the stroke of the movable rack board are so determined that each of the items contained within the rack housing in such a manner that the products are supported by respective pairs of product supporting members of the first and second groups which are provided on the side wall and the movable rack board, respectively. Each item passes though the product passage clearance between the first and second groups of product supporting members and move downwardly by one step during one vertical reciprocation of the movable board whereby the products are delivered from the rack housing beginning with the lowermost item.

Preferred embodiments of the invention will be described with reference to the accompanying drawings.

BRIEF DESCRIPTION OF THE DRAWINGS

FIGS. 1A-E are explanatory diagrams showing the fundamental construction of a product rack according to the invention and the steps of deliverying product items contained in the product rack;

FIGS. 2A and 2B are cross-sectional view showing modifications of the product rack shown in FIG. 1;

FIG. 3 is a perspective view, with parts cut away, showing specific examples of a rack housing and a movable rack board employed in the product rack of the invention;

DESCRIPTION OF THE PREFERRED EMBODIMENTS

Figure 4:
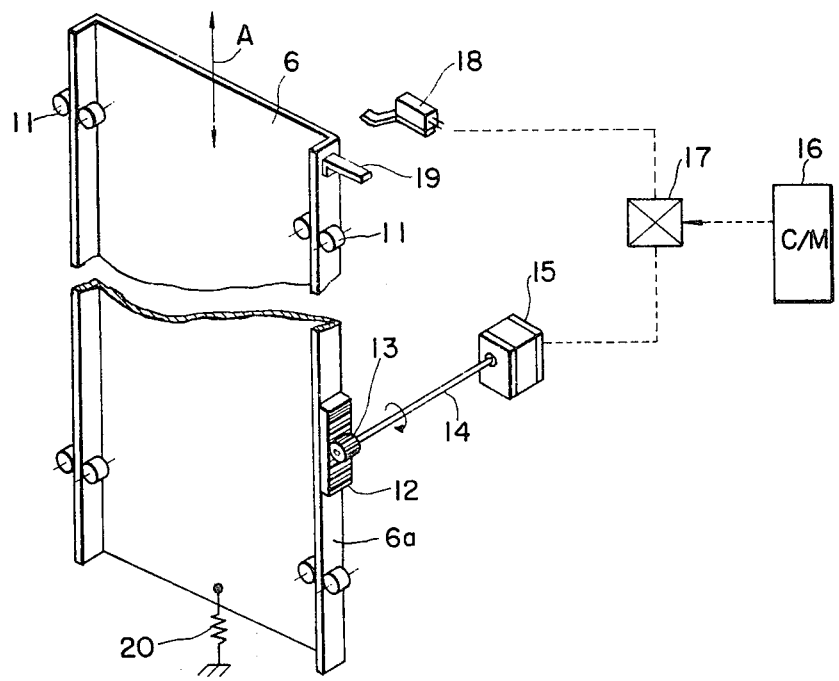
FIG. 4 is an explanatory diagram illustrating an arrangement of the drive mechanism of the movable rack board.

First, the fundamental construction of a product rack according to the invention and its delivery operation will be described with reference to FIGS. 1A–1E. In FIGS. 1A–1E, reference numeral 1 designates a rack housing which defines a product containing space 3 in which product items 2I, 2II and 2III are arranged vertically along a single straight line one on top of another. The bottom of the rack housing 1 is open to form a product delivery outlet 4. The housing 1 has one side wall 5 and a movable rack board 6 provided on a side wall opposite to the side wall 5. The movable rack board 6 is moved upwardly or downwardly as indicated by the arrows by a drive mechanism described below.

On the side wall 5 and the movable rack board 6, product supporting members 7 and 8 are arranged at predetermined vertical intervals like rungs on a ladder. Each product supporting member protrudes. More specifically, each of the product supporting members 7 and 8 is a beam extending perpendicularly to the plane of the figure. When the movable rack board 6 is at a product drop standby position as shown in FIG. 1A, the levels of the product supporting members 7 and 8 are the same. The product supporting members 8 move vertically together with the movable rack board 6 which is moved vertically from the time instant when the levels of the members 8 become the same as those of the members 7.

In the rack housing as described above, the distance between the side wall 5 and the movable rack board 6, the distance between adjacent product supporting members 7 and 8 and the height $d_1$ and thickness $d_2$ of each product supporting member and the stroke of the movable rack board 6 are determined so as to satisfy the following conditions:

$h > D$, $g_1 < D$, $g_2 \geq D$, and $l \geq D$ where D is the diameter of a product item 2, h is the vertical arrangement pitch of the product supporting members 7 and 8, $g_1$ is the product passage clearance defined by the confronting product supporting members 7 and 8 when the movable rack board 6 is set at the product drop standby position as shown in FIG. 1A, $g_2$ is the product passage clearance provided when the movable rack board 6 is set at its upper end point position as shown in FIG. 1C, and l is the horizontal distance between the side surface of the product supporting member 7 and the movable rack board 6 or between the side surface of the product supporting member 8 and the side wall 5.

In FIG. 1A, the items 2I through 2III are in the standby state. In this state, the items are supported by the pairs of product supporting members 7 and 8, respectively. As the movable rack board 6 is moved upwardly in the direction of the arrow A from the position shown in FIG. 1A, the items 2I through 2III are moved upwardly by the product supporting members 8 as a result of which the product items roll towards the side wall 5. That is, each of the items moves into the space which is defined by one of the product supporting members 8 and the upper and lower product supporting members 7 adjacent thereto as shown in FIG. 1B. The movable rack board 6 continues to move further upwardly. When the movable rack board 6 reaches its upper end point as shown in FIG. 1C, each item starts to roll and drop downwardly passing through the clearance $g_2$ as the clearance $g_2$ becomes larger than the diameter of one product item. As soon as the movable rack board 6 reaches the upper end point, it starts moving downwardly as shown in FIG. 1D. During this operation, the lowermost item 2I drops by its own weight. That is, it is delivered through the product delivering outlet 4 as indicated by the arrow B. At the same time, in constrast to the state shown in FIG. 1B, each of the remaining items 2II and 2III rolls into the space defined by one product supporting member 7 and the upper and lower product supporting members 8 adjacent thereto moving downwardly together with the movable rack board 6. When the movable rack board 6 reaches the product drop standby position again as shown in FIG. 1E, the items 2II and 2III are supported by the respective pairs of product supporting members 7 and 8 as in the case of FIG. 1A.

As is apparent from the steps of operation described above, whenever the movable rack board 6 is reciprocated vertically, each item is moved downwardly by one pitch. That is, the items 2II and 2III respectively at the second and third steps are moved to the lowermost (or first) step and the second step, respectively. In other words, whenever the movable rack board 6 is reciprocated, the product items are moved downwardly by one pitch and the item at the lowermost step is delivered.

In FIGS. 1A–1E, the section of each of the product supporting members 7 and 8 is rectangular. However, they may be trapezoidal so as to be suitable for the configuration of a product item 2 as shown in FIG. 2A. In FIGS. 1A–1E and FIG. 2A, the product supporting members 7 and 8 are individual parts which are fixedly secured to the side wall 5 and the movable rack board 6, respectively. However, either the product supporting members 7 or 8 may be formed as a single unit 7′ or 8′ which is fixedly secured to the side wall 5 or the movable rack board 6 as shown in FIG. 2B. In this case, the aforementioned horizontal distance l is measured from the top surface of the product supporting member 7′ or 8′ to the bottom of the recess formed therein. This construction is advantageous in that the rack board 6 and the side wall 5 are reinforced by the product supporting members. Furthermore, the product supporting member and the rack board 6 or the side wall 5 may be made of plastic material as a single unit.

Specific examples of the rack housing 1 and the movable rack board 6 are shown in FIG. 3. The front side of the rack housing 1 is open in order to load items 2 therein. The rear side of the rack housing is closed with a rear wall 9 in order to prevent the items 2 from falling down behind the housing. A guide frame 10 similar to a receptacle for sliding doors is provided on the side of the housing opposite to the aforementioned side wall 5. The movable rack board 6 is vertically slidably inserted into the guide frame 10. In the case where the product items 2 are bottles as illustrated, the longitudinal dimensions of the product supporting members 7 and 8 are so determined as to support the portion of each bottle of maximum diameter in compliance with the shape thereof.

The drive mechanism for moving the movable rack board 6 up and down will be described with reference to FIG. 4. The front and rear edge portions of the movable rack board 6 are bent in the form of a letter "L." These edge portions are inserted between pairs of guide rollers 11 so that the movable rack board 6 is guided in the directions of the arrows A, that is upwardly and downwardly. A rack 12 is provided vertically on the rear edge portion 6a of the movable rack board 6. A pinion 13 engaging the rack 12 is coupled through a connecting shaft 14 to a drive motor 15. The drive motor 15 is operated by a control circuit 17 in response to a "selling" signal which is produced by a coin operated mechanism 16 upon proper customer activation to rotate the pinion 13. As a result, the movable rack board 6 is moved upwardly from its lower or standby position.

A limit switch 18 is provided to detect the arrival of the movable rack board 6 at the upper end point position. More specifically, when the movable board 6 reaches the upper end point position, the limit switch 18 is operated by an actuator 19 which is mounted on the movable board 6 thereby deenergizing the drive motor 15. When the drive motor 15 stops, the movable board 6 is moved dowmwardly to the initial standby position by its own weight or by a returning spring 20 which may alternatively be provided. In the above-described example, the drive mechanism includes the rack, the pinion and the drive motor. However, the movable board may for instance be operated by means of an electromagnetic solenoid.

Figure 5:
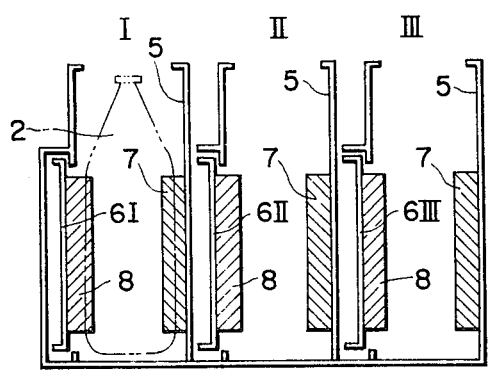
FIG. 5 is a cross-sectional plan view showing one example of a multi-column type product rack.

Next, one example of a multi-column product rack which is produced by combining plural product racks as described above will be described. A product rack having several columns is employed for a multi-selection type automatic vending machine which handles a variety of products. The multi-column type product rack as shown in FIG. 5 is constructed by juxtaposing a plurality of assemblies of rack housings 1 and movable rack boards 6 as described above with reference to FIG. 3. In FIG. 5 reference characters I, II and III designate the columns of the multi-column type product rack, respectively.

Figure 6:
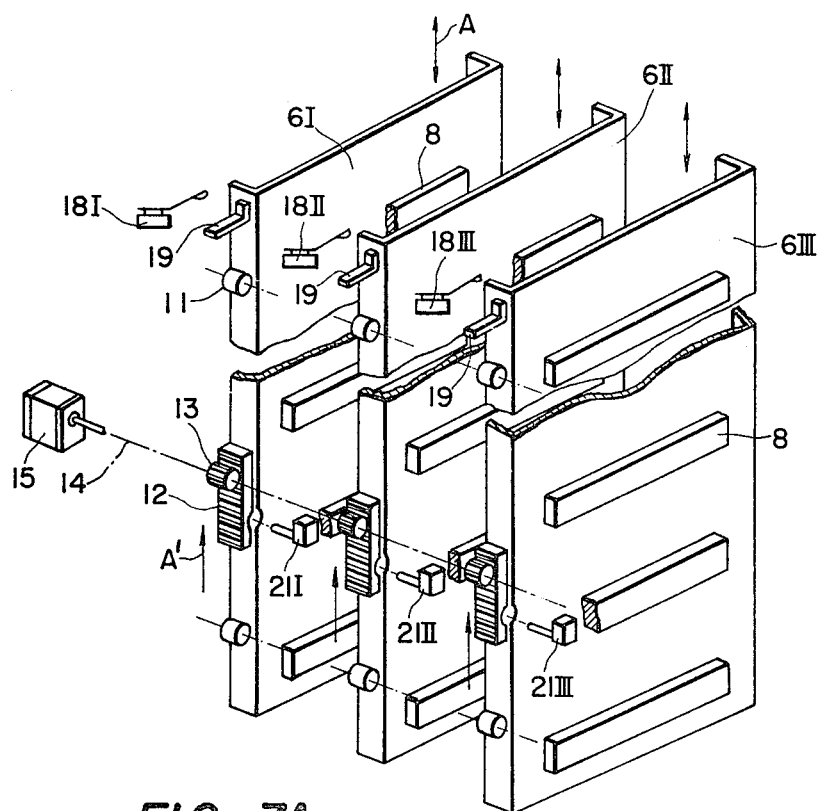
FIG. 6 is an explanatory diagram showing an arrangement of the drive mechanism of the multi-column type product rack shown in FIG. 5.
Figure 7A:
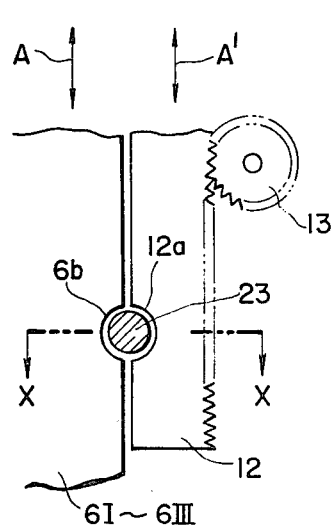
FIG. 7A is an enlarged side view showing the clutch mechanism of FIG. 6.
Figure 7B:
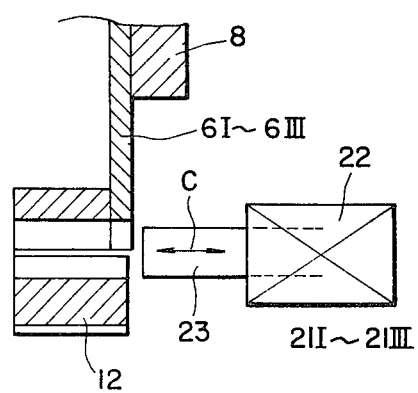
FIG. 7B is a cross-sectional view taken along line X—X of FIG. 7A.

One example of an effective drive mechanism which is applicable to the multi-column type product rack shown in FIG. 5 is illustrated in FIG. 6. In FIG. 6, reference characters 6I, 6II and 6III designate the movable rack boards of the columns, respectively. Clutch mechanisms 21I, 21II and 21III are provided for the movable rack boards 6I, 6II and 6III, respectively, in such a manner that they are controlled selectively to engage the movable rack boards and the racks 12 and to disengage therefrom. Each of the clutch mechanisms 21I through 21III as shown in FIGS. 7A and B include an electromagnetic solenoid 22 and a clutch pin 23 which is movable in the directions of the arrows C by the electromagnetic solenoid 22. In response to the operation of the solenoid 22, the clutch pin 23 goes into or goes out of the semicircular grooves 6b and 12a which are formed in the edge portions of the movable rack boards 6I, 6II and 6III and the rack 12 at the corresponding positions, respectively. When the pin 23 is not in the semicircular grooves, the clutch mechanism is in its released state. If, under this condition, the pinion 13 is rotated, only the rack moves upwardly as indicated by the arrow A'. On the other hand, when the electromagnetic solenoid is excited, the pin 23 is pushed outwardly to engage the rack 12 with the movable rack board. In this case, the movable rack board is moved upwardly in association with the rack 12.

Referring back to FIG. 6, one drive motor 15 is coupled through a rotary shaft 14 commonly to the pinions 13 of the movable rack board 6I, 6II and 6III. Accordingly, the pinions 13 and the racks 13 of all of the movable boards 6I, 6II and 6III are operated when the rotation of the drive motor 15 is started. When one of the clutch mechanisms 21I through 21III is selectively operated, only the movable board provided with the clutch mechanism thus operated is moved upwardly as indicated by the arrow A and the remaining movable boards are held in place. The movable boards 6I through 6III of the columns are provided with limit switches 18I through 18III, respectively, similar to the upper end point detecting limit swtich 18 shown in FIG. 4. As is apparent from the above description, if the clutch mechanisms 21I through 21III are operatively combined with the product selecting switches of the automatic vending machine, respectively, so that the operation, namely the engagement and disengagement of the clutch mechanisms are controlled by operating the product selecting switches, then only the movable board of the column which is selected can be moved to discharge the selected product while the remaining movable boards are maintained in their standby state and no products are discharged from their corresponding columns.

Figure 8:
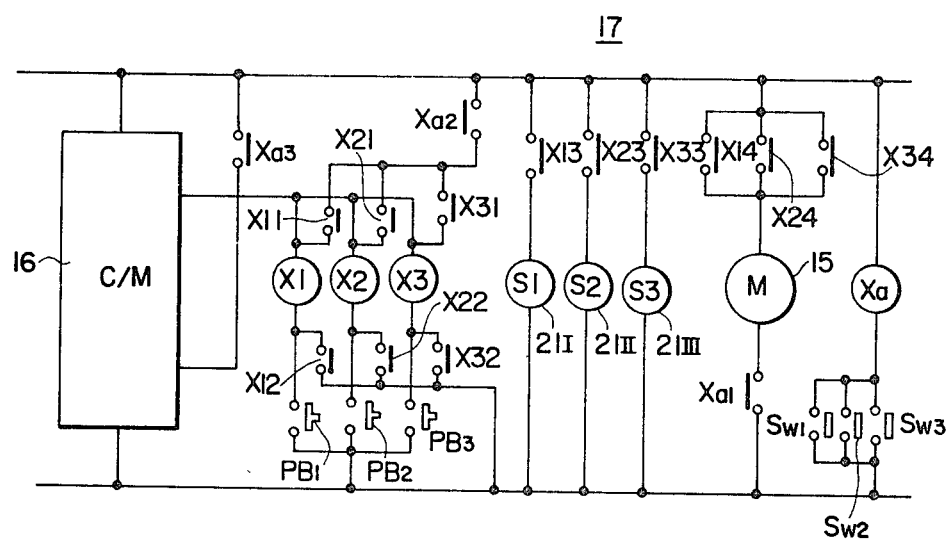
FIG. 8 is a simplified circuit diagram showing a sequence control circuit for controlling the vending operation of the multi-column type product rack.

FIG. 8 shows a theoretical sequence control circuit for controlling the selling operation of the multi-column type product rack shown in FIGS. 5 through 7B. The elements shown in FIG. 8 correspond to those which have been described above as follows. In FIG. 8, reference character C/M designates a coin sorting and counting mechanism, M the drive motor 15, S1 through S3 the solenoids of the clutch mechanisms 21I through 21III, SW1 through SW3 the limit switches 18I through 18III, PB1 through PB3 the commodity selecting push-button switches, X1 through X3 vend relays, and Xa an auxiliary relay. The circuit shown in FIG. 8 is simplified inasmuch as details of the mutual interlock contact circuits of the selecting push-button switches or the like are not shown.

The operation of the circuit shown in FIG. 8 will be described. Upon insertion of a coin or coins, the coin sorting and counting mechanism C/M produces a vend signal. When under this condition, one of the product selecting switches PB1 through PB3, for instance the switch PB1 is operated (in an actual control circuit the remaining switches PB2 and PB3 would be interlocked so that they may not be operated simultaneously), the vend relay X1 corresponding to the operated switch is operated thereby causing the solenoid S1 of the clutch mechanism 21I to be energized through the relay contact X13 and the drive motor 15 to be energized through the relay contact X14. As a result, the movable board 6I of column I is moved upwardly. When the movable board 6I reaches its upper end point, the limit switch SW1 is closed thereby energizing the auxiliary relay Xa, which operates contacts Xa1 through Xa3. As a result the coin sorting and counting mechanism C/M is stopped, the self-holding state of the vend relay X1 is released, and the rotation of the drive motor M is halted. Immediately after the drive motor M is stopped, the movable board 6I is moved downward towards the standby position. During this operation, the selected product is discharged from the column I.

As is apparent from the above description, the product rack according to the invention has the following merits. Product items can be arranged vertically along a single straight line in the product rack of the invention. Therefore, the width of the rack is smaller than that of a conventional rack in which products are stacked in a staggered arrangement of along two lines and, accordingly, it is possible to make an automatic vending machine incorporating the invention very slim. In the standby state, in which the apparatus stands ready to discharge a prduct, the product items are separately supported by the product supporting members in the rack housing, respectively. Accordingly, the weight of the upper items is never applied to the lower items and the items are never struck against one another during the delivery operation. That is, the product items are never damaged or broken. This feature is considerably advantageous in handling large bottles. Furthermore, in the standby state, the product supporting members positively prevent the product items from dropping. Accordingly, theft is prevented with the automatic vending machine employing the invention, that is, no item can be removed from the machine without first depositing money. Thus, a product rack according to the invention has a high reliability in regard to theft prevention. Furthermore, each product delivery operation is carried out by a single reciprocation of the movable rack board and is fullyexecuted when the movable rack board reaches the lower standby position according to the invention. Therefore, no lock mechanism such as is required with a conventional elevator mechanism-type product rack is necessary. The movable rack board is merely moved along straight lines thereby requiring only a simple mechanism. Thus, the product rack is also low in manufacturing cost and high in mechanical reliability.

In addition, in the case where a multi-column type product rack is provided for a multi-selection type automatic vending machine, according to the invention the columns can be selectively operated by a single drive motor merely by adding a simple clutch mechanism to the drive mechanism. Thus, the product rack according to the invention is quite effective in many ways in the practical construction of an automatic vending machine.

What is claimed is:

1. A product rack for an automatic vending machine, comprising: a rack housing defining a product containment space in which product items are arranged in at least one vertical line one above another with means for providing a product delivering outlet at the bottom thereof, said product items being substantially cylindrical in shape and having equal dimensions; a movable rack board provided opposite to one side wall of said rack housing, said rack board being movable vertically; first and second groups of product supporting members provided respectively on said one side wall and said movable rack board at equal vertical intervals and protruding inwardly; and a drive mechanism for performing a lifting operation wherein said movable rack board is moved upwardly from a lower standby position thereof and is then moved downwardly to said lower standby position, the vertical interval distance h of each of said first and second groups of product supporting members, the horizontal distance l between said one side wall and said second group of product supporting members or between said movable rack board and said first group of product supporting members, a product passage clearance g between said first and second groups of product supporting members, and the stroke length of said lifting operation of said movable rack board being determined such that said product items are supported by respective pairs of product supporting members of said first and second groups in said standby position and pass through said product passage clearance between said first and second groups of product supporting members and move downwardly by one step during one vertical reciprocation of said movable rack board.

2. A product rack as claimed in claim 1 wherein said product supporting members of each of said first and second groups are formed as individual members which are fixedly secured to the inner surfaces of said one side wall and said movable rack board.

3. A product rack as claimed in claim 1 wherein said first group of product supporting members are formed as a single unit which is fixedly secured to the inner surface of said one side wall and said second group of product supporting members are formed as a single unit which is fixedly secured to the inner surface of said movable rack board.

4. A product rack as claimed in claim 1 wherein said first group of product supporting members are integral with said one side wall and said second group of product supporting members are integral with said movable rack board.

5. A product rack as claimed in claim 1 wherein said drive mechanism for operating said movable rack board comprises a rack mounted on said movable rack board, a pinion engaged with said rack, and a electric motor coupled to said pinion and started by a selling instruction signal.

6. A product rack as claimed in claim 1 wherein a plurality of assemblies of said rack housing and movable rack boards are juxtaposed to form a multi-column product rack.

7. A product rack as claimed in claim 6 wherein said rack comprises an drive electric motor coupled to each of said pinion in said drive mechanisms of the columns of said multi-column product rack and a plurality of clutch mechanisms, one of said clutch mechanisms being provided for each column in such a manner that each clutch mechanism is selectively engageable with and disengageable from said rack and said movable rack board of said column.

8. A product rack as claimed in claim 7 wherein said clutch mechanism is selectively engageable with and disengageable from said rack and said movable rack board in response to a product selection signal.

9. A product rack as claimed in any of claims 1 to 8 wherein $h > D$, $g_1 < D$, $g_2 \geq D$ and $l \geq D$ where D is the diameter of a product item, h is the vertical arrangement pitch of the product supporting member, $g_1$ is the product passage clearance when said movable rack is in said standby position, $g_2$ is the product passage clearance when said movable rack is at an upper end point position and l is a horizontal distance between a side surface of a product supporting member and said movable rack board.

* * * * *